May 14, 1929.　　　G. W. FEY　　　1,713,041
FISHHOOK COUPLING DEVICE
Filed Jan. 9, 1926
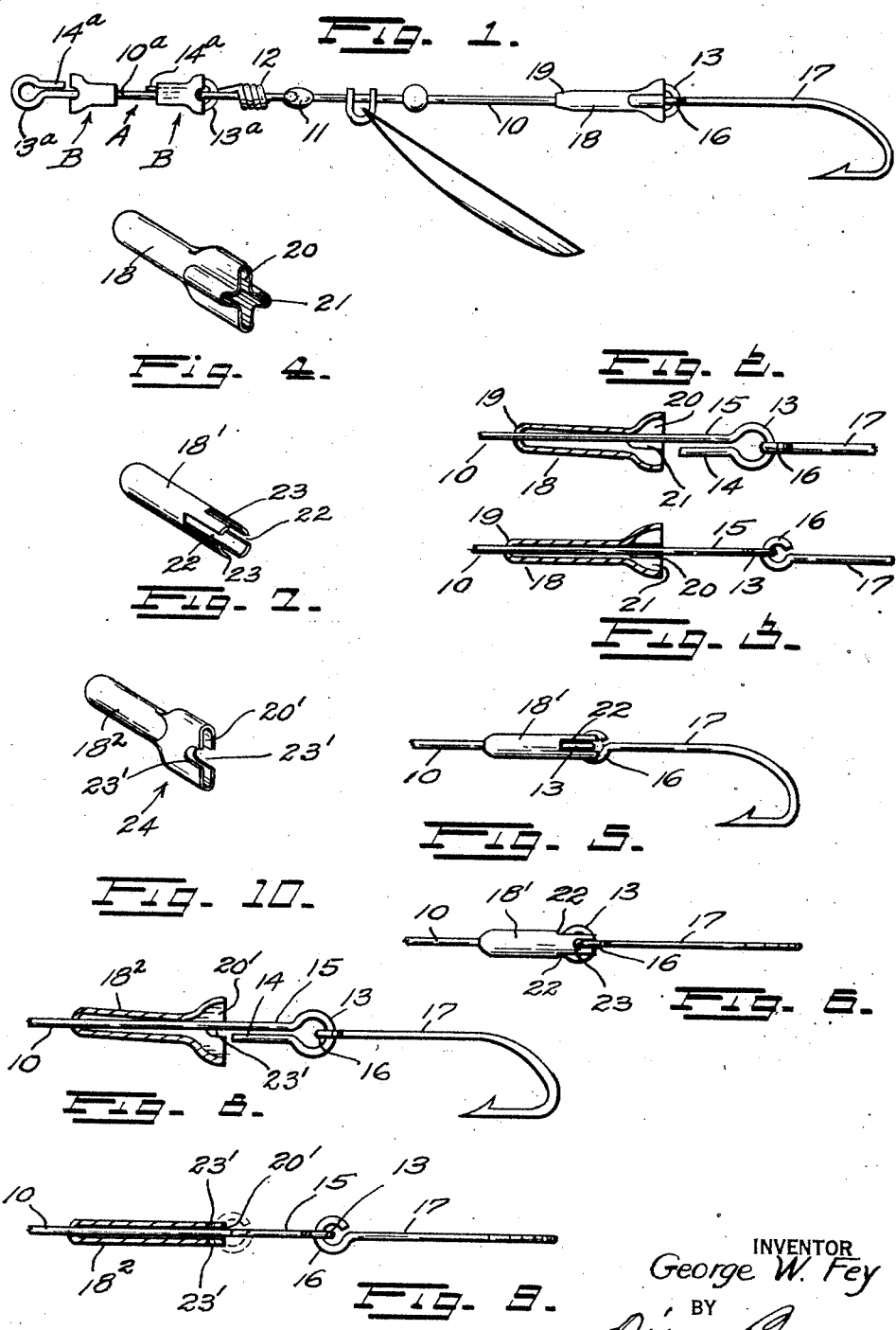
INVENTOR
George W. Fey
BY
ATTORNEY Patented May 14, 1929.

1,713,041

UNITED STATES PATENT OFFICE.

GEORGE W. FEY, OF SEATTLE, WASHINGTON.

FISHHOOK-COUPLING DEVICE.

Application filed January 9, 1926. Serial No. 80,336.

This invention relates to novel improvements in fish hook coupling devices for fishing tackle of the spinner, trolling, or casting spoon types, wherein rigid shaft members or metallic rods fabricated from wire material of suitable gage are employed and interposed between the fishing lines and fish hooks thereof, and the primary aim of the present invention is to provide a fish hook coupling device whereby the fish hook may be rapidly and expeditiously attached to and detached from its correlated fishing line, and when attached is rigidly held or retained at all times in a downward position or direction, is fixedly secured against wobbling or flying over, and is positively prevented from fouling upon itself.

Contemplated by the present invention is a fishing tackle embodying improvements directed particularly to a metallic shaft member having its ends return-bent to form thereat looped terminal portions or eyes and inwardly extending rectilinear bill portions, said looped portions or eyes being especially designed for accommodating the looped terminals or eyes of the correlated fish line and fish hook connected therewith; sleeve or guard members slidably mounted upon said shaft member to sheath and house the bill portions of the same, and provided with recessed or enlarged cruciform outer ends to receive and accommodate the looped terminal portions or eyes of the shaft member and the looped terminals or eyes of the fish line and fish hook interconnected or engaged therewith, whereby the fish line and fish hook are positively retained in fixed or rigid relation with respect to the shaft member, all of which are important objects and features of the invention and are to be correlated in the broad aim of enhancing the efficiency of the device for general use.

The above, and additional objects which will hereinafter be more specifically treated are attained by such means as are shown in the accompanying drawings, described in the following specification and then more clearly pointed out in the claims, which are appended hereto, and form part of this application.

With reference to the drawings, in which there are illustrated several embodiments of the invention, and throughout the several views of which like characters of reference designate similar parts:

Figure 1 is a side elevation of fishing tackle embodying my invention; Fig. 2 is a detail view showing in elevation portions of the wire shaft and the shank of a fishhook, and a hook guard, which is illustrated in its retracted position, shown in longitudinal section; Fig. 3 is a view similar to Fig. 2 illustrating the parts shown therein on a plane at right angles to that in which represented in Fig. 2; and Fig. 4 is a perspective view of the fishhook guard shown in Figs. 1, 2 and 3. Fig. 5 is a side elevation of a fishhook and a portion of the wire shaft to which is applied a modified form of hook guard; Fig. 6 is a plan view of Fig. 5; and Fig. 7 is a perspective view of the guard shown in Figs. 5 and 6. Fig. 8 is a view partly in elevation and partly in longitudinal section of a fishhook, and shaft to which is applied a second modified form of the invention; Fig. 9 is a view of the parts shown in Fig. 8 taken in a plane at right angles to that in which Fig. 9 is represented; and Fig. 10 is a perspective view of the guard shown in Figs. 8 and 9.

Referring first to Figs. 1 to 4, inclusive, showing the preferred form of the invention, the numeral 10 represents a wire, conventionally known as the shaft, having its leading end connected by means of a swivel-ball 11 to a swivel 12 all of known or suitable construction. The other end of the shaft is folded back upon itself in a manner to afford at the bend a circular loop 13 (Fig. 2) from which extends an extremity 14 parallel with and alongside of the main portion of the shaft.

The rear portion of the shaft formed as above described constitutes, in effect, a hook of which the extremity 14 is the bill and the shaft portion 15 in proximity with the loop 13 is the shank, as hereinafter termed.

A fishhook is coupled to said shaft by having the loop portion 13 of the shaft hook engage in the eye 16 of the fishhook shank 17. To detachably secure the fishhook in such engagement, I employ upon the shaft a sleeve 18, hereinafter termed the guard, which serves as a sheath or housing for both the shaft's shank and its bill portion. The forward end of the guard is desirably tapered as at 19 to afford an easy passage through the water. The rear end of the guard is of a cruciform to provide interiorly of the guard two mouths 20 and 21 disposed at right angles to each other, the mouth 20 constituting a socket for the loop portion 13 of the shaft and mouth 21 a socket for the eye portion 16 of the fishhook. Said mouths or sockets are each of an oblong shape in a plane at right angles to the axis of the shaft, so that when the guard is shifted from the position in which it is represented in Figs. 2 and 3 into the position in which the guard is represented in Fig. 1, the guard serves to rigidly retain the fishhook in substantially aligned relation with the shaft. The socketing of the shaft loop 13 and the eye 16 of the fishhook in the respective oblong mouths serve to retain the same in fixed right angular relation with each other.

The modified construction of the guard illustrated in Figs. 5, 6 and 7, comprises a tubular sleeve $18^1$ of a substantially cylindrical form the shank and bill portions of the shaft being sheathed within the forward portion of the sleeve. In this construction, the shaft loop 13 engages in slots 22 provided in diametrically opposite sides of the sleeve at its rear end and the fishhook eye engages in notches 23 provided in diametrically opposite sides of the sleeve between the responsive slots 22.

The third form of the invention illustrated in Figs. 8, 9 and 10 consists of a sleeve $18^2$ which at its rear end is flattened, as at 24, to afford an oblong mouth $20^1$ of sufficient width to permit the loop 13 of the associated shaft 10 (Figs. 8 and 9) entering into such mouth, the shaft and sleeve then being coupled with each other against independent rotary movement. In each of its flattened sides the sleeve is provided with a notch $23^1$ to accommodate the eye, as $16^1$ for example, of a fishhook 17 as in Figs. 8 and 9.

The above described guard devices are not confined for use in securing a fishhook to the shaft member of fishing tackle, as it may be advantageously applied otherwise, an example of which is illustrated at the left hand side of Fig. 1 as employed upon a link A, known in the art as a connector, for connecting the swivel member 12 to a loop provided upon a fishing line which is not shown.

More particularly, with the connector there is employed a piece of wire $10^a$ each end of which is folded back upon itself to provide a hook having a loop $13^a$ and a bill $14^a$; and for each such hook is provided a guard as B which, in this instance, is similar to the guard illustrated in Figs. 8, 9, and 10. The connector guards are, in like manner, sleeved upon the connector wire for movement into and from engaged relation with the respective hook.

The invention affords a simple and inexpensive coupling, which is most conveniently employed for detachably connecting together members provided with looped engageable elements, and serves to guard or sheath the same in a manner to prevent the accidental disengagement of the members.

With fishing tackle it is especially valuable, inasmuch as the coupling and its guard may be regulated without difficulty by a fisherman. The guard is readily shifted longitudinally of the shaft, yet when in its engaged position with the shaft loop it is secured thereby against rotative movement, and also, in turn, by its engagement with the eye of a fishhook serves to interlock the same in fixed relation with said shaft loop.

While I have herein disclosed the invention with sufficient detail to enable those skilled in the art to understand the mode of construction and the principles involved, it is to be understood that there is no intentional limitation therein to the specific form and precise details of construction of the invention shown and described, except as expressly defined by the appended claims, and that various modifications of such forms and constructions may be resorted to without departing from the spirit of the invention or the benefits derivable therefrom. I also desire to have it understood that certain features of the invention herein disclosed may be employed in other combinations than those shown and described.

What I claim, is:

1. In combination with a fish line having a terminal loop, of a fish hook having a terminal eye engageable within said terminal loop, and a sleeve slidably mounted upon said fish line engageable with said loop and eye for rigidly coupling said hook to said line against independent movement.

2. In combination with a fish line, of a shaft member connected therewith having a loop formed upon the outer terminal thereof, a fish hook having a terminal eye engageable within said loop, and a sleeve slidably mounted upon said shaft member engageable with said loop and eye for rigidly coupling said hook to said member against independent movement.

3. In combination with a fish line, of a shaft member connected therewith having the outer terminal thereof return-bent to form a loop and an inwardly extending bill portion thereat, a fish hook having a terminal eye engageable within said loop, and a sleeve slidably mounted upon said shaft member to sheath said bill portion and engage said loop and eye for rigidly coupling said hook to said member against independent movement.

4. In combination with a fish line, of a shaft member connected therewith having a loop formed upon the outer terminal thereof, a fish hook having a terminal eye engageable within said loop, and a sleeve slidably mounted upon said shaft member having a cruciform outer terminal engageable with said loop and eye for rigidly coupling said hook to said member against independent movement.

5. In combination with a fish line, of a shaft member connected therewith having a loop formed upon the outer terminal thereof, a fish hook having a terminal eye engageable within said loop, and a sleeve slidably mounted upon said shaft member having an exteriorly tapered forward end and a recessed rear end engageable with said loop and eye for rigidly coupling said hook to said member against independent movement.

6. In combination with a fish line, of a wire member having its inner end connected therewith and having its outer end bent upon itself to form a relatively large loop and a bill portion extending inwardly therefrom in substantially parallel relation to said wire member, a fish hook having a terminal eye engageable with said loop, and a forwardly tapered sleeve slidably mounted upon said wire member for sheathing said bill portion and having a recessed rear end engageable with said loop and eye for rigidly coupling said hook to said member against independent movement.

7. In a fish hook coupling device, in combination, a wire bent upon itself to form a loop to accommodate the eye of a fish hook and the like, and a sleeve slidably mounted upon said wire adapted to engage said loop and eye for rigidly coupling said hook to said wire against independent movement.

8. In a fish hook coupling device, in combination, a wire bent upon itself to form a loop and a bill portion extending inwardly therefrom to receive and accommodate the eye of a fish hook and the like, and a sleeve slidably mounted upon said wire for sheathing said bill portion and engageable at its outer end with said loop and eye for rigidly coupling said hook to said wire against independent movement.

9. In a fish hook coupling device, in combination, a wire shaft having a loop formed upon one end thereof to accommodate the eye of a fish hook, and a sleeve slidably mounted upon said wire shaft engageable with said loop and eye when the plane of said eye is at right angles to the plane of said loop for rigidly coupling said hook to said shaft against independent movement.

Signed at Seattle, Washington, this 5th day of November, 1925.

GEORGE W. FEY.